(12) United States Patent
Gosling et al.

(10) Patent No.: US 7,832,154 B2
(45) Date of Patent: Nov. 16, 2010

(54) POSITION RETENTION MECHANISM FOR MODULAR WALL ASSEMBLY

(76) Inventors: Geoff Gosling, 32 Collingwood Place NW, Calgary, Alberta (CA) T2L 0P9; Mogens Smed, Box 2, Site 8, RR1, De Winton, Alberta (CA) T2Y1Z4

( * ) Notice: Subject to any disclaimer, the term of this patent is extended or adjusted under 35 U.S.C. 154(b) by 174 days.

(21) Appl. No.: 11/855,477

(22) Filed: Sep. 14, 2007

(65) Prior Publication Data

US 2008/0066413 A1 Mar. 20, 2008

Related U.S. Application Data

(60) Provisional application No. 60/826,044, filed on Sep. 18, 2006, provisional application No. 60/826,055, filed on Sep. 18, 2006, provisional application No. 60/826,051, filed on Sep. 18, 2006.

(51) Int. Cl.
*E04B 1/61* (2006.01)
*E04B 2/00* (2006.01)
*E04H 1/00* (2006.01)
*F16B 9/00* (2006.01)

(52) U.S. Cl. ............ 52/127.6; 52/238.1; 52/582.2; 52/584.1; 403/252; 403/255

(58) Field of Classification Search .......... 52/582.1, 52/582.2, 578, 220.7, 238.1, 239, 127.6, 52/127.9, 584.1; 403/331, 252, 255, 264
See application file for complete search history.

(56) References Cited

U.S. PATENT DOCUMENTS

| | | | | |
|---|---|---|---|---|
| 4,545,142 A | * | 10/1985 | Whisnant | 40/605 |
| 4,556,337 A | * | 12/1985 | Marshall | 403/255 |
| 4,625,483 A | * | 12/1986 | Zacky et al. | 52/239 |
| 5,012,625 A | * | 5/1991 | Propst | 52/241 |
| 5,058,347 A | * | 10/1991 | Schuelke et al. | 52/239 |
| 5,090,170 A | * | 2/1992 | Propst | 52/243.1 |
| 5,176,462 A | * | 1/1993 | Chen | 403/252 |
| 5,592,794 A | * | 1/1997 | Tundaun | 52/220.7 |
| 5,749,197 A | * | 5/1998 | Jolly | 52/584.1 |
| 6,351,916 B2 | * | 3/2002 | Militzer | 52/239 |
| 6,691,380 B2 | * | 2/2004 | Vassiliou | 24/295 |
| 6,718,599 B2 | * | 4/2004 | Dickinson et al. | 24/295 |
| 7,461,484 B2 | * | 12/2008 | Battey et al. | 52/220.7 |
| 2003/0233738 A1 | * | 12/2003 | Osterland et al. | 24/293 |
| 2004/0168382 A1 | * | 9/2004 | Rudduck et al. | 52/238.1 |
| 2007/0154258 A1 | * | 7/2007 | Knapp | 403/331 |

FOREIGN PATENT DOCUMENTS

KR 100587464 B1 6/2006

* cited by examiner

*Primary Examiner*—Richard E Chilcot, Jr.
*Assistant Examiner*—Branon C Painter
(74) *Attorney, Agent, or Firm*—Workman Nydegger (57) ABSTRACT

A system for connecting modular walls includes a position retention mechanism configured to releasably retain a plurality of wall modules together. In one implementation, the position retention mechanism includes opposing front and back surfaces or walls, and one or more channels formed therebetween. The position retention mechanism is further configured with a plurality of spring tabs positioned within the one or more channels, wherein the spring tabs are configured to lock into a plurality of opposing connector interfaces corresponding to the opposing wall modules, such that the positioning retaining mechanism secures adjacent, opposing wall modules together. The position retention mechanism can further be configured with different surfaces to connect or hold a variety of components of various shapes together.

15 Claims, 9 Drawing Sheets

POSITION RETENTION MECHANISM FOR MODULAR WALL ASSEMBLY

CROSS-REFERENCE TO RELATED APPLICATIONS

The present invention claims the benefit of priority to U.S. Provisional Patent Application No. 60/826,044, filed on Sep. 18, 2006 entitled "Position retention Mechanism for Modular Wall Assembly," and to U.S. Provisional Patent Application No. 60/826,051, filed on Sep. 18, 2006, entitled "Variable Connection System for Modular Wall Systems," and to U.S. Provisional Patent Application No. 60/826,055, filed on Sep. 18, 2006, entitled "Custom Connection System for Modular Walls," The entire content of each of the aforementioned patent applications is incorporated herein by reference.

BACKGROUND OF THE INVENTION

1. The Field of the Invention

Implementations of the present invention relate generally to mechanisms for connecting and aligning adjacent wall modules.

2. Background and Relevant Art

Office space can be relatively expensive, not only due to the basic costs of the location and size of the office space, but also due to any construction needed to configure the office space in a particular way. For example, an organization might purchase or rent a large open space in an office complex, and then subdivide or partition the open space into various offices, conference rooms, or cubicles, depending on the organization's needs and size constraints. Rather than having to find new office space and move as an organization's needs change, it is often necessary to have a convenient and efficient means to reconfigure the existing office space. Many organizations address their configuration and reconfiguration issues by dividing large, open office spaces into individual work areas using modular office partitions.

In particular, at least one advantage of modular systems is that they are relatively easy to configure. In addition, another advantage is that modular systems can be less expensive to set up, and can be reconfigured more easily than more permanently constructed office dividers. For example, a set of offices and a conference area can be carved out of a larger space in a relatively short period of time with the use of modular systems. If needs change, the organization can readily reconfigure the space.

In general, modular office partitions typically include a series of individual wall modules (and/or panels). The individual wall modules can either be free-standing or rigidly attached to one or more support structures. In addition, the wall modules are typically designed so that they can be assembled together to form a range of different configurations. In particular, a manufacturer or assembler can usually align and join the various wall modules together in almost any particular design, and then secure the design in place with any number of fasteners. These designs can include anything from large conference spaces to individual offices. A "finished" look is generally completed by adding gaskets or trim pieces in the joints between wall modules.

One will appreciate, however, that the assembly of such partitions can present a number of challenges. For example, individual wall modules or panels will not typically stand upright without outside support, thus making it difficult to attach panels to one another. In conventional systems, assemblers have typically addressed these problems by holding the panels in place either manually or with some improvised method while attaching fasteners. Because of these improvised methods, achieving the correct vertical spacing for the addition of trim pieces is often challenging. Moreover, it can be difficult with these improvised methods to align the wall modules horizontally so that the top and bottom edges of the panels are properly aligned.

Accordingly, there are a number of difficulties associated with partitioning interior or exterior spaces with modular systems that can be addressed.

BRIEF SUMMARY OF THE INVENTION

Implementations of the present invention relate to systems, methods and apparatus for easily and efficiently clasping or attaching a plurality of modular wall components together, such as by attaching one wall module or divider, partition, etc.) to one or more other wall module. In particular, implementations of the present invention include one or more position retention mechanisms configured to easily and instantly insert into one or more rails or channels from two different opposing wall modules, thereby securing the opposing wall modules. The one or more retention mechanisms can be configured to be self-locating, and to align the wall modules on a horizontal and/or vertical plane.

For example, a position retention mechanism in accordance with an implementation of the present invention can include opposing first and second walls. The position retention mechanism can also include a plurality of opposing channels formed between the first and second walls. In addition, the position retention mechanism can include a plurality of spring tabs positioned between the opposing first and second walls and within the opposing first and second channels. The opposing walls are configured to guide the position retention mechanism along opposing rails of corresponding opposing connector interfaces through at least one of the opposing channels.

In addition, a system in accordance with an implementation of the present invention can include a plurality of connector interfaces each configured with a plurality of opposing rails. The system can also include a position retention mechanism configured to reversibly join aligned complementary connector interfaces by insertion of the position retention mechanism into the at least one rail of each of the aligned, complementary connector interfaces.

Furthermore, a method of partitioning an interior space in accordance with an implementation of the present invention can include determining an arrangement of modular walls to subdivide an interior space, wherein at least two modular walls are to be connected together. The method can also include sliding a position retaining mechanism about opposing elements extending from both of the at least two modular walls. In addition, the method can include locking the position retaining mechanism in place, wherein the at least two modular walls are secured in both a vertical and horizontal direction.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention extend to systems, methods and apparatus for easily and efficiently clasping or attaching a plurality of modular wall components together, such as by attaching one wall module or divider, partition, etc.) to one or more other wall module. In particular, implementations of the present invention include one or more position retention mechanisms configured to easily and instantly insert into one or more rails or channels from two different opposing wall modules, thereby securing the opposing wall modules. The one or more retention mechanisms can be configured to be self-locating, and to align the wall modules on a horizontal and/or vertical plane.

As will be understood more fully herein, the one or more position retention mechanisms can perform these and other functions while maintaining a specific spacing between wall modules (e.g., vertical or horizontal members). In one implementation, the specific spacing can allow a manufacturer to add additional connectors (e.g., gaskets, trim components) between wall modules, or otherwise provide the manufacturer with access therebetween using various tools, such as a tool to add or remove the position retention mechanism. In additional or alternative implementations, the one or more retention mechanisms can also be used to connect various components or objects other than wall modules as such, including custom connectors for customized or virtualized intersections, or connecting other framing members. The one or more position retention mechanisms can thus be configured to hold any such components or modules in place until other fasteners are in place, or can be used as the primary method of attachment, where applicable.

Figure 1A:
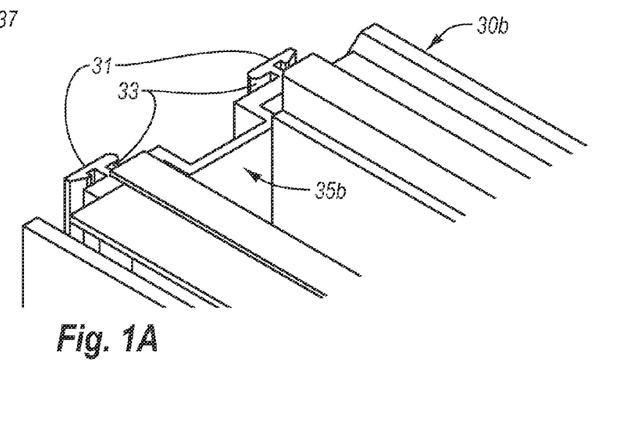
FIG. 1A illustrates a perspective view of a retention mechanism in accordance with an implementation of the present invention, and prior to attachment of the retention mechanism to at least one wall module.
Figure 1B:
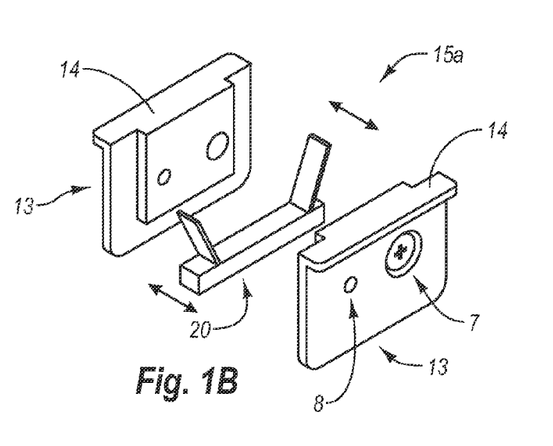
FIG. 1B illustrates an exploded perspective view of the retention mechanism shown in FIG. 1A.

FIG. 1A illustrates a schematic diagram of a system 5 in which a position retention mechanism 15(a) is used to ultimately connect two opposing wall modules 30a and 30b, while FIG. 1B illustrates an exploded view of the position retention mechanism 15a. As shown in both FIGS. 1A and 1B, an exemplary position retention mechanism 15(a) essentially comprises opposing front and back surfaces (or "walls") 13. The opposing surfaces/walls 13, when joined together, form opposing channels or slots 17 for receiving a portion (e.g., a rail) of a connector interface 35a and 35b, discussed more fully below. FIGS. 1A and 1B also show that the position retention mechanism 15a can comprise one or more spring tabs 20, such as one or more spring-based tabs, positioned between the walls 13, and thus within the channels or slots 17. As also discussed more fully below, the one or more spring tabs 20 are configured to lock the position retention mechanism 15 within or along a position of a connector interface 35a.

In addition, FIGS. 1A and 1B show that this particular implementation of the position retention mechanism 15a comprises opposing right-angle returns 14 extending essentially perpendicularly from both opposing walls 13. As understood more fully below, the right angle returns 14 can be used to provide one or more support functions when placed at a top or bottom edge of a given wall module 30a-b, or other component (e.g., FIG. 5). In additional or alternative implementations, however (e.g., position retention mechanisms 15b-c), the wall 13 of a given position retention mechanism can be created or otherwise formed without any right angle return (e.g., 15b, FIG. 4A), or with only one right angle return (e.g., 15c, FIG. 5A), which allows the position retention mechanism to be positioned in still different types of spaces and provide still different functions.

To connect two opposing wall modules, FIG. 1A shows that each wall module 30a or 30b can comprise a connector interface 35(a-b) extending therefrom or otherwise attached thereto. In at least one implementation, the attached connector interface 35 generally comprises a continuous plate (e.g., metallic materials, plastic materials, or composites thereof) that follows along (all or portions of) the length of an edge of the given wall module 30(a-b). In at least one implementation, a given wall module 30 might be formed with the connector interface 35 as an end of the wall module. Of course, in at least another implementation, a manufacturer may simply attach a connecter interface 35 to a preexisting wall module in order to implement the functionality described herein. In either case, a connector interface 35a is configured and used herein as a component to which a manufacturer attaches a position retention mechanism for connecting opposing wall modules together.

For example, FIG. 1A shows that a connector interface 35 comprises various features for guiding and holding a given position retention mechanism 15 in place. In particular, FIG.

1A shows that connector interfaces 35*a* and 35*b* generally comprise opposing connector rails 31. Connector rails 31, in turn, form opposing slots or channels 33 between the rails 31 and the main body of the connector interface 35. In addition, FIG. 1A shows that the connector rails 31 also comprise opposing notches 37, which are configured to receive one or more corresponding spring tabs 20 of the position retention mechanism 15. As shown more fully with respect to FIG. 2A, therefore, the slots or channels 17 of position retention mechanism 15*a* fit about or along the rails 31, while at least one of the walls 13 of the position retention mechanism 15 fits within the channels or slots 33 of the connector interface 35. Thus, the rails 31, walls 13, and channels 17 and 33 combine to guide into (and hold the position retention mechanism 15*a* in) a particular position (i.e., at notches 37) along a given connector interface 35 (and hence on a given modular wall).

Figure 2A:
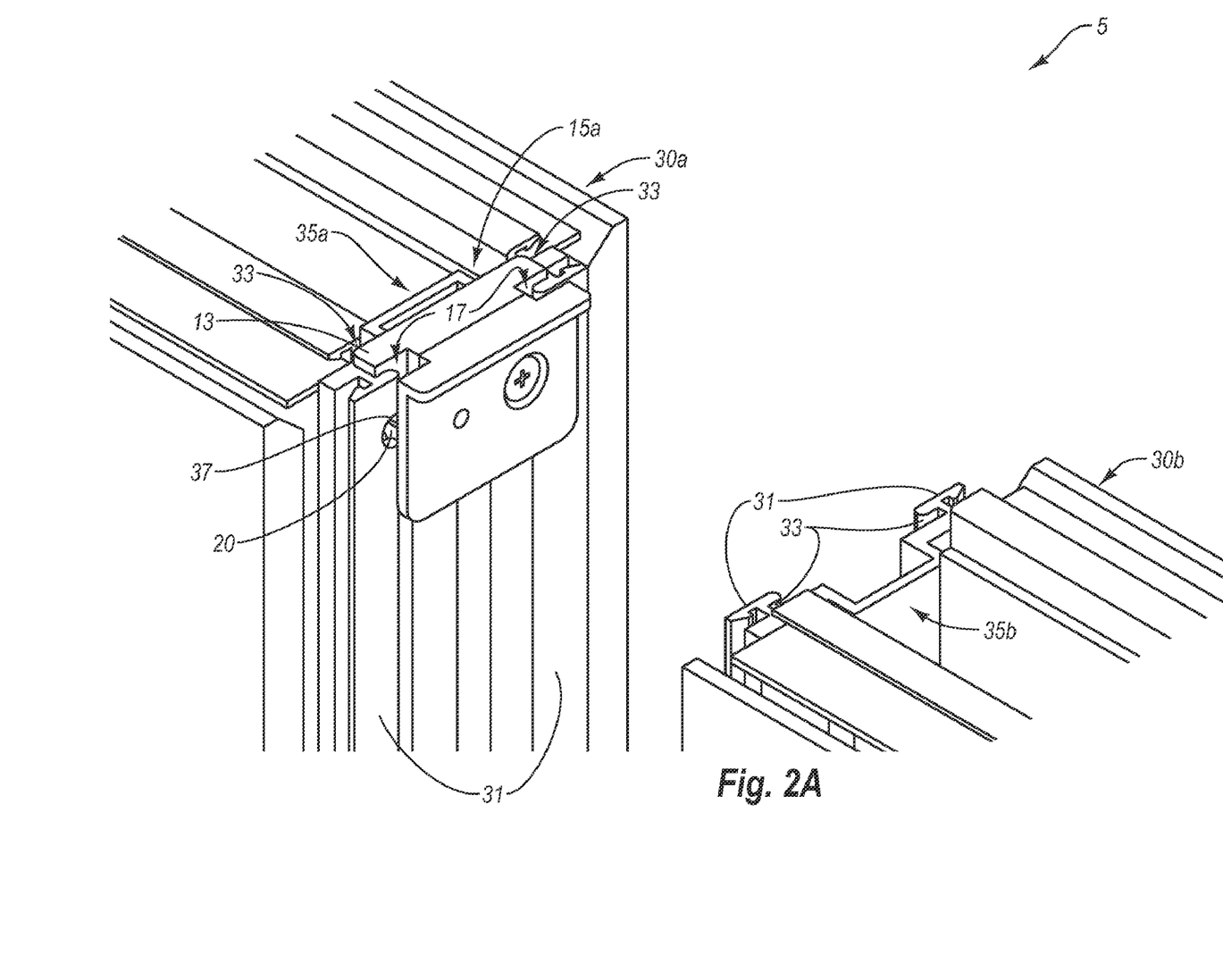
FIG. 2A illustrates a top perspective view of the retention mechanism shown in FIG. 1 after the retention mechanism has been coupled to at least one wall module.

FIG. 2A illustrates a top perspective view of the wall modules 30*a* and 30*b* after a manufacturer or assembler has positioned or otherwise attached the position retention mechanism 15*a* on one wall module 30*a*. In particular, FIG. 2A shows that the manufacturer has positioned the position retention mechanism 15*a* so that rails 31 of the connector interface 35 fit within corresponding slots 17 of the position retention mechanism 15*a*, and so that at least one of the walls 13 of positioning retaining mechanism 15*a* slides within slots 33 in the connector interface 35*a*. In addition, FIG. 2A shows that at least one of the one or more tabs 20 of the position retention mechanism 15*a* has opened into and engaged the corresponding notch 37 of connector interface 35*a*.

In at least one implementation of assembly, therefore, a manufacturer positions wall module 30*a* into a particular position in an interior or exterior space. The manufacturer also positions a second wall module 30*b* adjacent the first wall module 30*a*. In order to ultimately secure the second wall module 30*b* with respect to the first wall module 30*a*, the manufacturer aligns the channels 17 of position retention mechanism 15*a* about or along opposing rails 31 in both of the corresponding connector interface(s) 35*a* and 35*b*. The manufacturer also slides the opposing walls 13 of position retention mechanism 15*a* along both sets of slots 33 of the opposing connector interface 35*a* and 35*b* until the tabs 20 of the position retention mechanism open into both sets of notches 37 in opposing connector interfaces 35*a-b*. Although FIG. 2A does not expressly show the notches 37 in connector interface 35*b*, one will appreciate that the connector interface 35*b* is, in this illustration, essentially a mirror image of connector interface 35*a*.

Figure 2B:
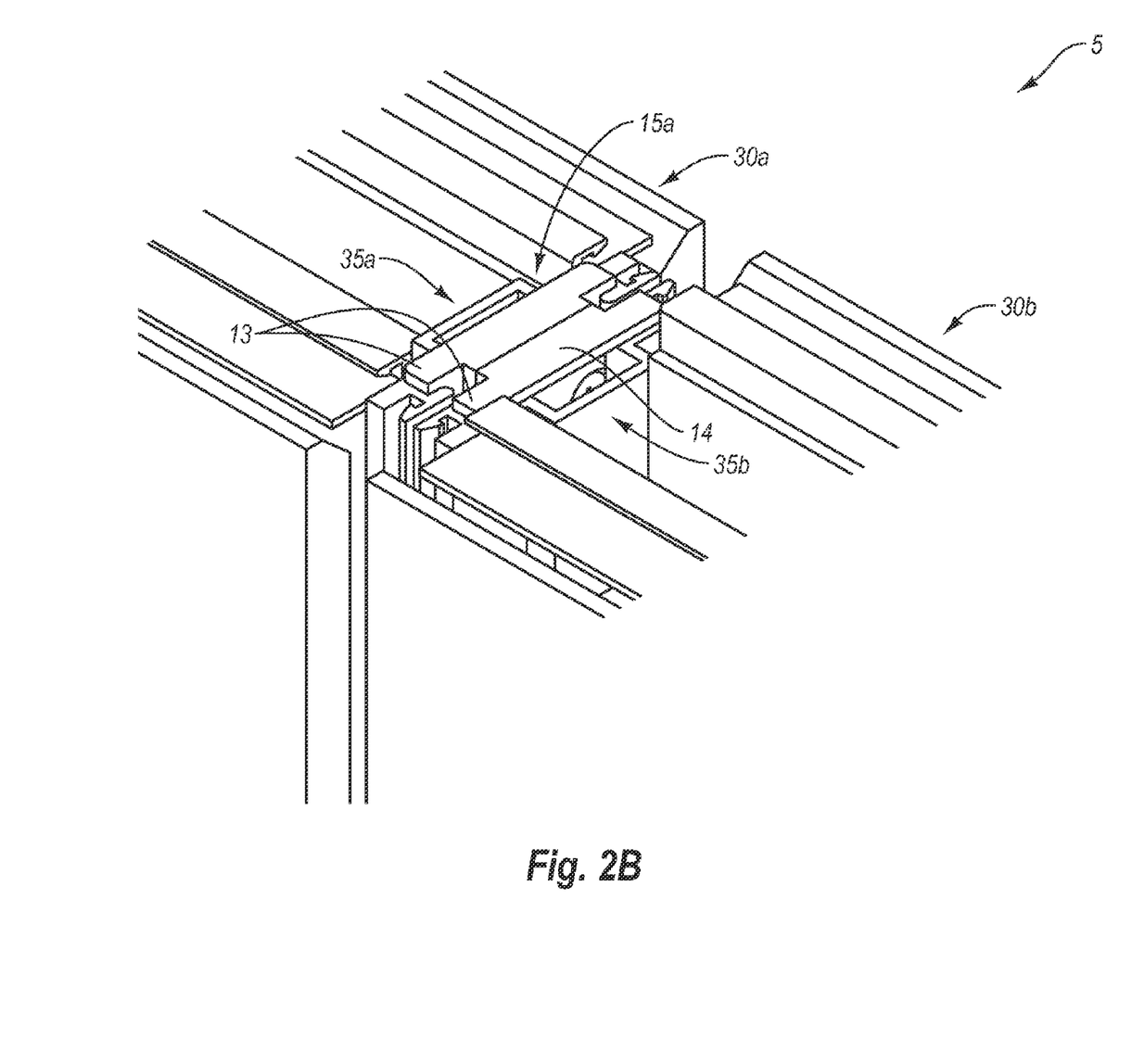
FIG. 2B illustrates a top perspective view of the retention mechanism shown in FIGS. 1A and 2A after the retention mechanism has been coupled to both of the opposing, illustrated wall modules.

FIG. 2B illustrates an essentially completed version of the assembly illustrated in FIG. 2B, in which the manufacturer has inserted the position retention mechanism 15*a* within or along the rails 31 and slots 33 of both connector interfaces 35*a* and 35*b*. As such, FIG. 2B shows that the position retention mechanism 15*a* joins both of connector interfaces 35*a-b* together. In particular, FIG. 2B shows that position retention mechanism 15*a* securely holds at least the upper portions of wall modules 30*a* and 30*b*, where connected. The wall modules 30*a* and 30*b* will thus remain connected until the manufacturer disengages (e.g., via an appropriately shaped or sized tool) the spring tabs 20 of the position retention mechanism, and pulls (or otherwise moves) the position retention mechanism 15*a* out of position.

FIG. 2B also shows that the position retention mechanism 15*a* holds the two wall modules 30*a* and 30*b* so that the corresponding connector interfaces 35*a-b* are essentially flush with one another. In particular, FIG. 2B shows that the position retention mechanism 15*a* secures the wall modules 30*a* and 30*b* close together, virtually creating a seal between the connector interfaces 35. Of course, in at least some configurations, and depending on the shape and/or dimensions of the various connector interfaces 35, there may not be a complete seal, and there will be at least some spacing between the two connector interfaces that allows for some egress of air, light, or sound, and/or enough space to receive at least a portion of a trim or finishing component (e.g., element 45, FIG. 3A).

Figure 3A:
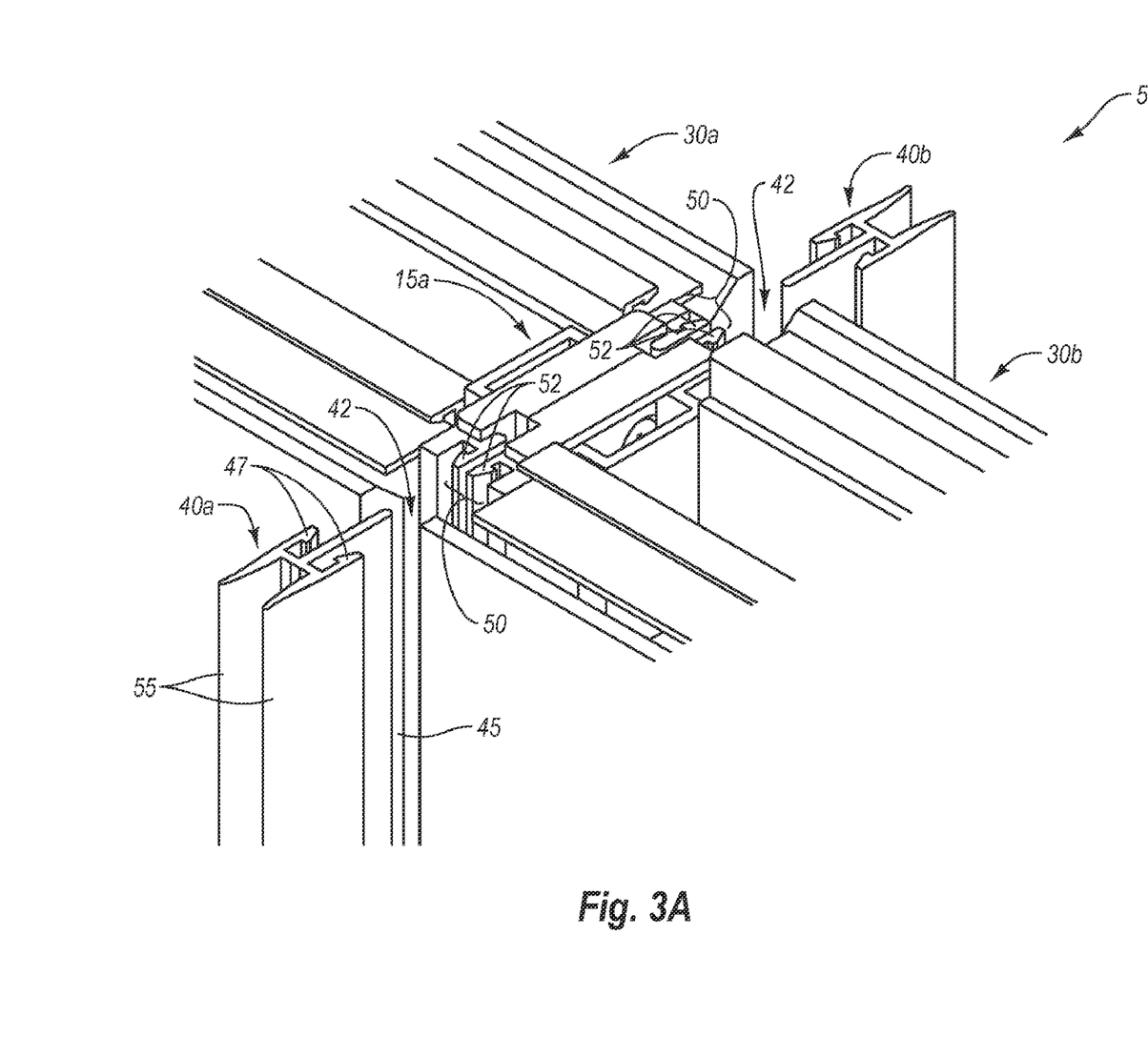
FIG. 3A illustrates a top perspective view of the assembled components in FIGS. 1A-2B, wherein one or more trim members or gaskets are being added thereto.

For example, FIG. 3A illustrates that a manufacturer can further add one or more flexible gaskets 40*a* (also referred to as "trim" or a trim component) to a joint between two different wall modules to add various sealing or attachment functions, as described more fully below. As a preliminary matter, one will appreciate that gaskets 40*a* and 40*b* can be made of virtually any number of synthetic or naturally occurring materials, including for example, metallic, rubber, and plastic materials, or composites thereof. In general, gaskets 40*a* and 40*b* are created with appropriate materials so as to be at least partly flexible, which aids assembly with a transverse connection interface 50. Gaskets 40*a* and 40*b* are further configured in material and shape to block air, light, or sound that would otherwise emanate between the two wall modules 30*a* and 30*b*. Accordingly, gaskets 40*a* and 40*b* can be configured to provide a range of structural, aesthetic, and privacy functions.

In any event, FIG. 3A illustrates that, when the extreme ends of rails 31 on connector interfaces 35*a* and 35*b* are attached together via position retention mechanism 15*a*, the combined rail 31 edges form transverse connection interface 50. FIG. 3A shows that this transverse connection interface 50 presents ridged extensions 52. These ridged extensions 52, in turn, are configured to reciprocally fit within the grooves of corresponding reciprocal connectors 47 in gasket 40*a*. In addition, FIG. 3A shows that gasket 40*a* further comprises a gasket extension 45 configured to fit within a gap formed between ridged extensions 52.

Accordingly, the manufacturer positions gasket 40*a* (and 40*b*) into the corresponding transverse connection interfaces 50 at least in part by aligning the various gasket extensions 45 and connectors 47 therewith. In particular, and after securing wall modules 30*a* and 30*b* together, the manufacturer can position a given gasket extension 45 into a slot defined between the ridged extensions 52 of transverse connection interface 50. The manufacturer can then align and press the reciprocal connectors 47 against the ridged extensions 52 of the transverse connection interface 50 until the gasket 40*a* (and/or 40*b*) effectively snaps or otherwise fits into position against the outside extreme edges of the combined rails 31.

Figure 3B:
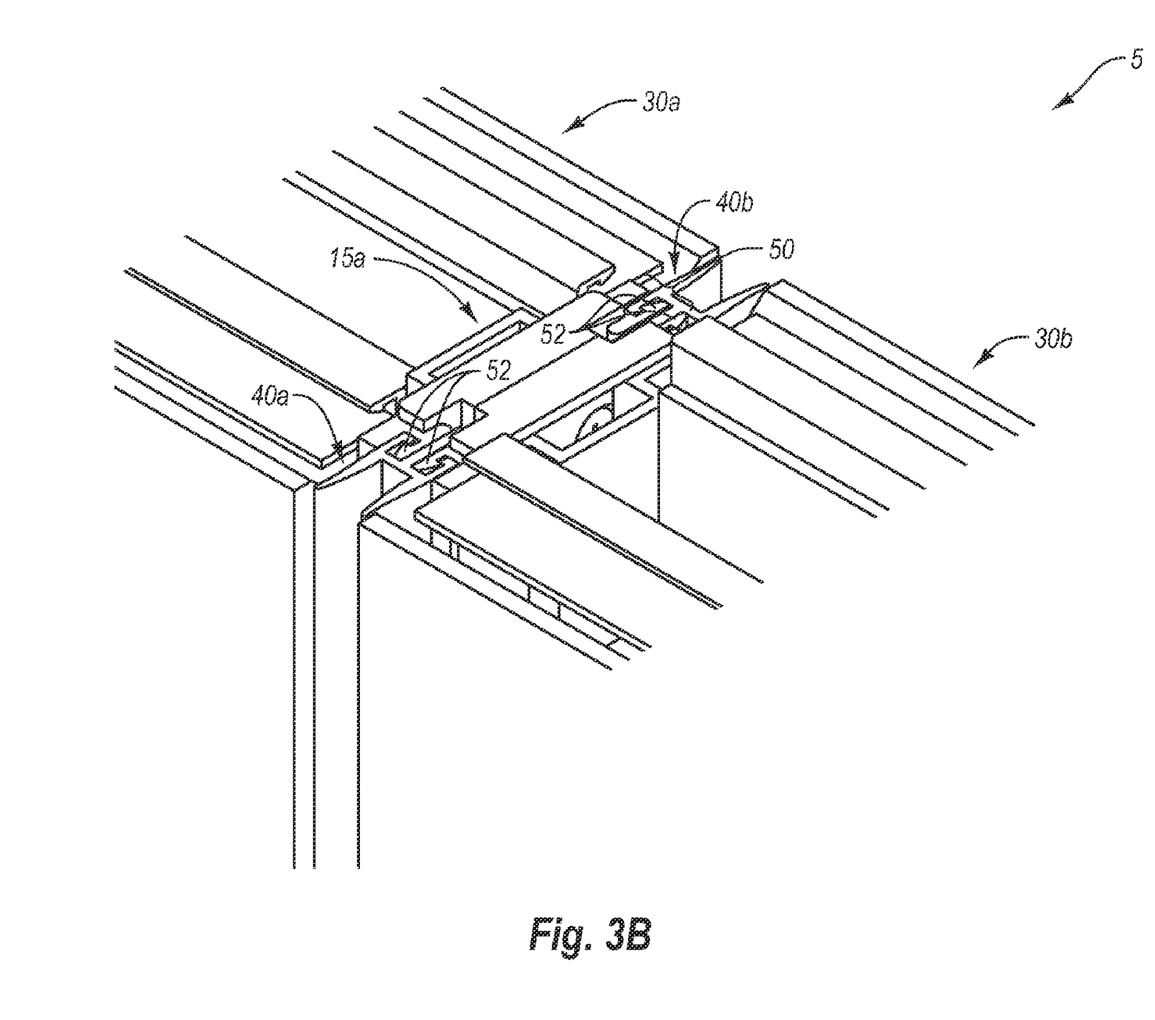
FIG. 3B illustrates a top perspective view of the assembled components of FIG. 3A.

In addition, FIG. 3A shows that each gasket 40(*a-b*) can comprise a set of flanges 55. One will appreciate that flanges 55 can be used for a variety of different functions, including providing a gripping interface for aligning and positioning gasket 40 within transverse connection interface 50. In at least one implementation, however, flanges 55 are also or alternatively configured to seal sound and air between wall modules 30*a-b*. Furthermore, the flanges 55 can be configured to add certain aesthetic or design characteristics to the intersection between wall modules 30*a-b*. In either case, one will appreciate that the attachment of trim or gasket components 40 can add further stability to the attachment between wall modules 30*a-b* in addition to that already provided by position retention mechanism 15*a*. Along these lines, FIG. 3B illustrates a top perspective view of the position retention mechanism 15*a* after gaskets 40*a* and 40*b* have been used to secure, attach, and seal the opposing wall modules 30*a* and 30*b*.

Figure 4A:
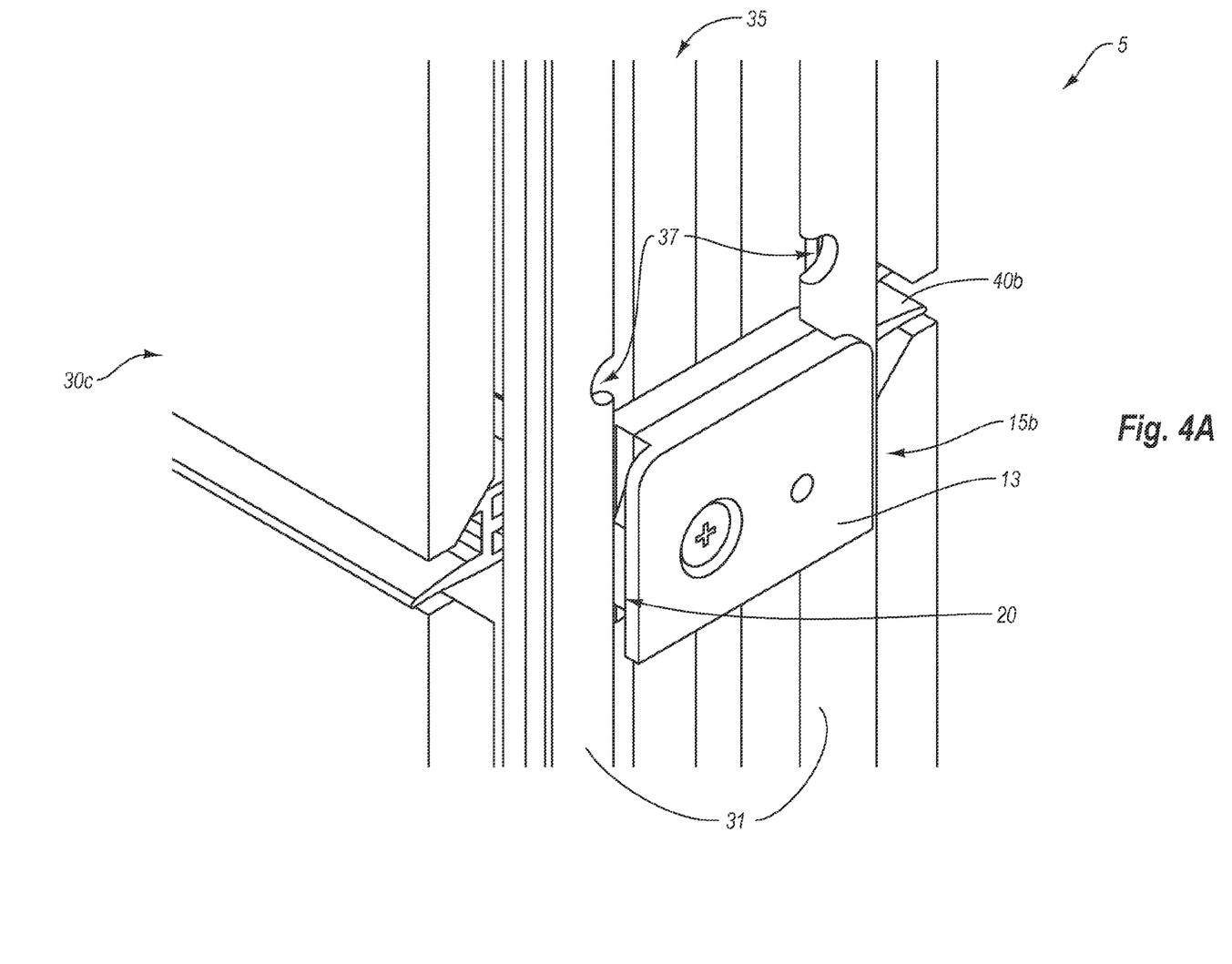
FIG. 4A illustrates a side perspective view of an alternate mid-span retention mechanism as it is being slid into a position of a connector interface on one side, but prior to attaching to another wall module on the opposing viewable side.

In addition to the foregoing, one will appreciate that any of the components described herein can be modified any number of ways to provide similar or identical functions. For example, in addition to the design or functional aspects previously described for gaskets 40a and 40b, the position retention mechanism 15a can also be modified for yet additional structural or attachment functions. Along these lines, FIG. 4A illustrates an alternative implementation of a position retention mechanism, or position retention mechanism 15b. In general, the illustrated alternative position retention mechanism 15b is configured with no right angle return 14 on either of position retention mechanism walls 13. This configuration thus provides a substantially planar interface on both the inner position retention mechanism wall 13 and exposed position retention mechanism wall 13, and thus provides a number of different benefits, at least one of which includes providing for a "mid-span" connection between two wall modules.

For example, the manufacturer, in addition (or alternative) to only connecting the top or bottom portions of the wall modules 30a and 30b, as previously described, can use position retention mechanism 15b to connect a mid portion of two opposing wall modules (i.e., the connector interfaces thereof). Such mid-span connections may be needed for a number of different reasons. For example, the wall modules (e.g., 30c) may be particularly tall, and thus a manufacturer may prefer the horizontal and vertical positional security of having multiple different attachments between the wall modules at one or more mid points, rather than just at the top and/or bottom points (e.g., as shown in FIG. 1B). In these or other examples, the manufacturer may also prefer to minimize the space between two wall modules (e.g., 30a, 30b, and/or 30c), so that the each wall module or panel is as close as possible (or desired) to the next adjacent wall module or panel thereof. As previously mentioned, for example, the manufacturer may desire to create a privacy partition, which has minimal pass through of sound, air, or light, etc.

Accordingly, FIG. 4A shows an implementation in which a mid-span position retention mechanism 15b is being attached to a mid point of connector interface 35. To this end, FIG. 4A shows that connector interface 35 comprises a set of mid-span notches 37 for receiving a mid-span position retention mechanism 15b. To connect the mid-span position retention mechanism 15b, therefore, the manufacturer slides the one or more mid-span position retention mechanism 15b along rails 31 (from a top or bottom direction) until reaching one or more sets of mid-span notches 37. Of course, the manufacturer will ultimately secure the mid-span position retention mechanism 15b by engaging mid-span notches 37. For example, FIG. 4B shows the mid-span position retention mechanism 15b after the manufacturer has finished sliding or otherwise inserting the mid-span position retention mechanism 15b along the rails 31 into a locked position with mid-span notches 37.

Thus, in contrast with FIGS. 1A-3B, wherein the manufacturer can slide the position retention mechanism 15a in a relatively simply manner (e.g., directly with hands from the top down), one will appreciate that there may be cases in which the manufacturer or assembler may need to use a tool to direct or guide the position retention mechanism 15b into position, such as in a mid-span position. For example, in at least one implementation, the manufacturer or assembler can position the mid-span position retention mechanism 15b with a thin tool (not shown), which is configured to fit within the spacing between vertical wall modules (e.g., 30e). Such a tool can be particularly configured to raise or lower (or otherwise guide) the one or more mid-span position retention mechanisms 15b until the spring tabs 20 engage the notches 37 within the opposing connector interfaces 35. One will appreciate that such a tool can also not only join wall modules (e.g., 30a-c) together, but also join wall modules to doors or posts, or anywhere it may be difficult to access the position retention mechanism.

Figure 4B:
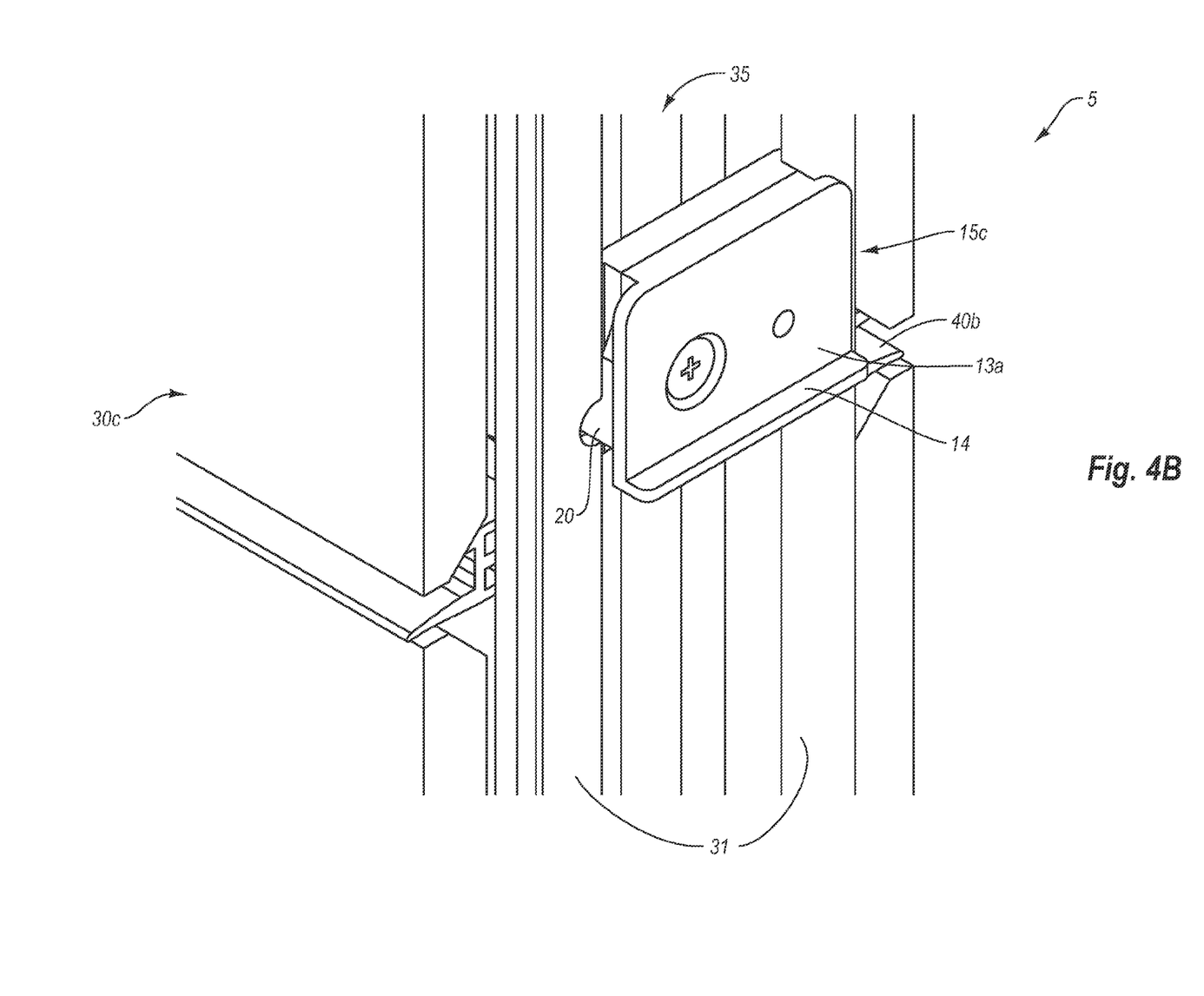
FIG. 4B illustrates a side perspective view of yet another alternate retention mechanism, in which the retention mechanism includes a right angle return for connecting still other components.

In addition to the foregoing, FIG. 4B illustrates an additional side perspective view of a mid-span position retention mechanism, albeit an alternative mid-span position retention mechanism 15c. In particular, the illustrated position retention mechanism 15c comprises a substantially planar wall 13 on one side (hidden from view) with only one right angle return 14 on the exposed facing side. This alternative configuration for the position retention mechanism 15c provides still additional functions, and can be used to support custom components on the end of a wall module (or similar) at the mid-span position. For example, the exposed right angle return 14 can act as a support bracket to attach other custom components, or to attach custom variable angle connectors, as described more fully herein. This is at least partly since the right angle return 14 can act as a stop mechanism to support and locate another other custom component.

Figure 5A:
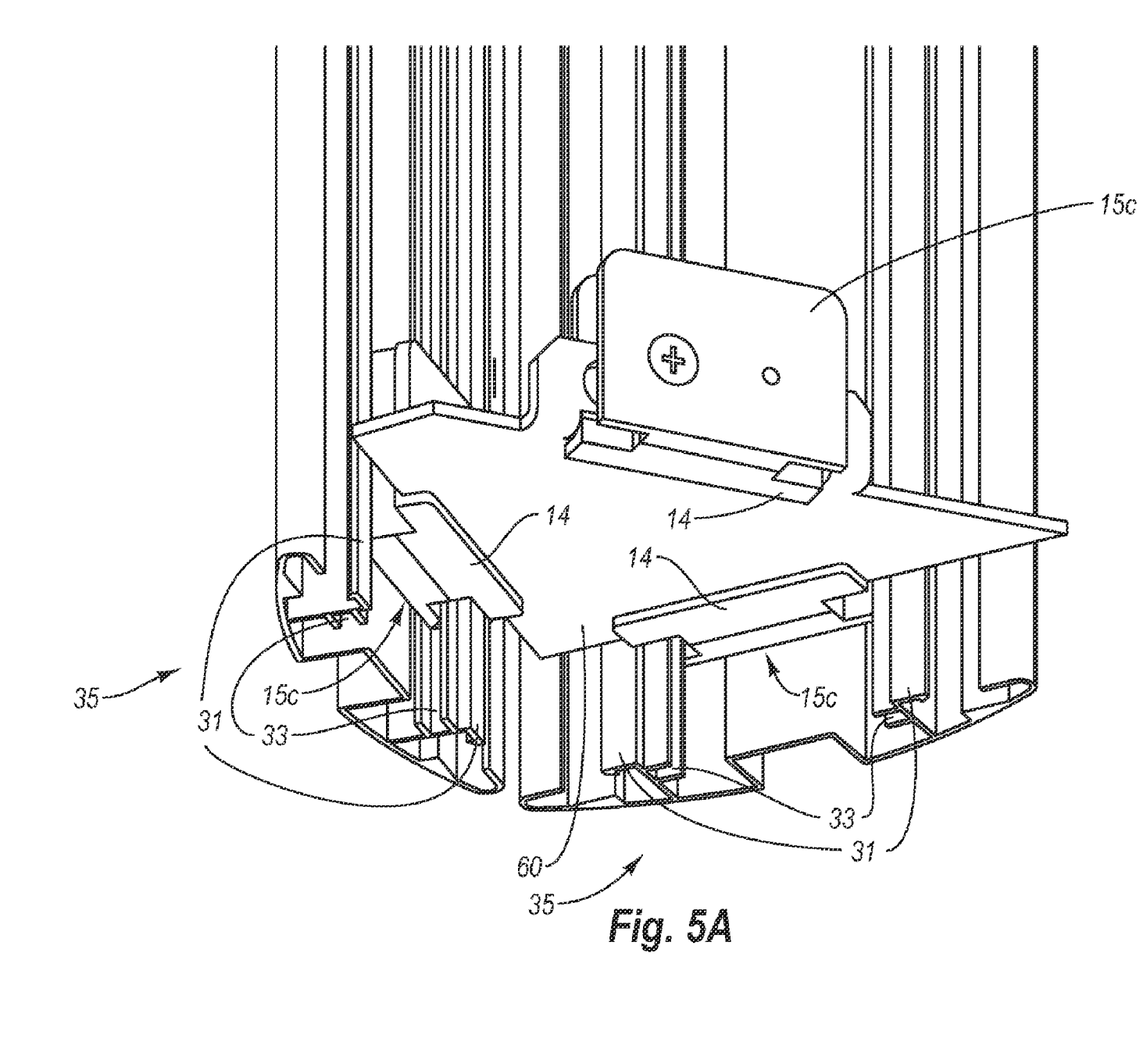
FIG. 5A illustrates a perspective view of an alternative implementation in which a plurality of retention mechanisms are used in conjunction with a variable angle connector to create a custom-shaped virtual connector post for connecting or intersecting wall modules.

For example, FIG. 5A illustrates an implementation in which multiple mid-span position retention mechanisms 15c, which each comprises one right angle return 14, are used to hold a variable angle connector 60 in a vertical position. In addition, FIG. 5A illustrates an implementation in which multiple different connector interfaces 35, each having a set of rails 31 and channels or slots 33 for receiving a position retention mechanism 15c, are used to create a virtual connector post 65. As a preliminary matter, the illustration of FIG. 5A shows the connector interfaces 35 without the remainder of the attached wall module 30. This omission is primarily for purposes of convenience in illustration in order to highlight the connection between variable angle connector 60 and the connector interfaces 35. One will appreciate, therefore, that the position retention mechanism and variable connector plate can be used to attach completed wall modules at an intersection, and/or to attach connector interfaces (to create a connector post) that are not also attached to a wall module.

In any event, a manufacturer can use a variable angle connector 60 when needing a modified, non-standard intersection between wall modules 30, such as any angle between about 0° and 180°, other than traditional 0°, 90° and 180° angles. As described more fully below, one or more variable angle connectors 60 can be used to create an intersection between wall modules that conforms to the desired angle. The intersection formed with each of the one or more variable angle connectors is a "virtual connector post," since no actual, elongate connector post is used at the intersection.

Figure 5B:
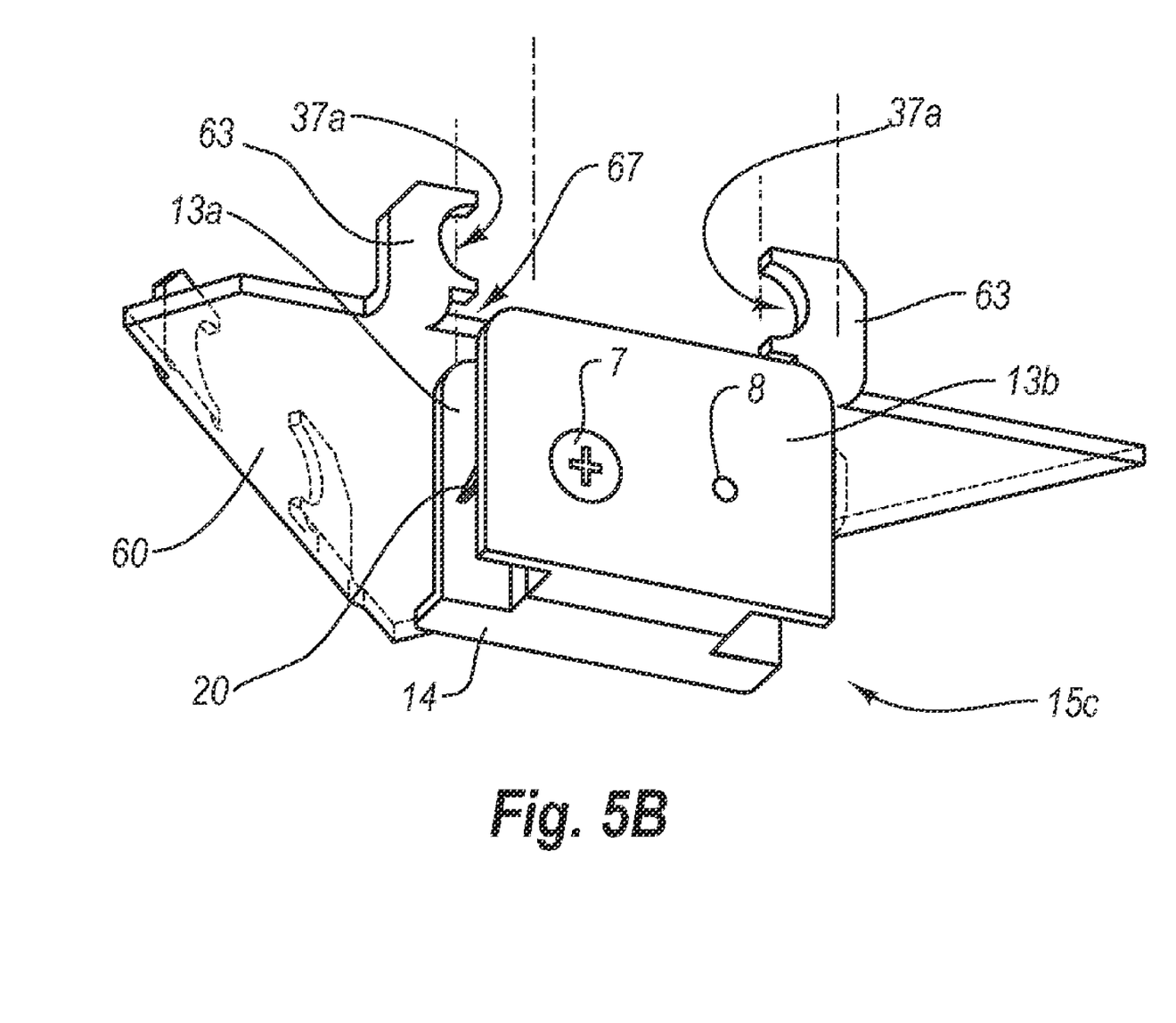
FIG. 5B illustrates a perspective exploded view of the variable angle connector and position retention mechanism of FIG. 5A.

To create a virtual connector post (i.e., the intersection of the joined connector interfaces 35 or of joined wall modules 30), the manufacturer prepares a variable angle connector 60 that is configured with the desired connection angle for each partition. For example, if desiring a partition assembly with a triangular intersection, the manufacturer prepares a triangular variable connector interface 60. In addition, to enable connection with each position retention mechanism 15c, FIG. 5B shows that a variable angle connector 60 in accordance with the present invention comprises a set of raised tabs 63 that extend essentially perpendicularly with respect to the main surface of the variable angle connector. The raised tabs 63 each further comprise a notch 37a, and form a slot 67 with the main surface of the variable angle connector 60. Upon preparing or obtaining the variable angle connector 60, therefore, the manufacturer can then attach each position retention mechanism 15.

For example, FIG. 5B is a schematic diagram for assembling a position retention mechanism 15c with a variable angle connector 60. In particular, FIG. 5B shows that the manufacturer can position the wall 13a comprising the right angle return 14 within slot 67 of the variable angle connector 60. The manufacturer thus slides the position retention mechanism 15c along the raised tabs 63 until the spring tabs 20 open into corresponding notches 37. This is similar for how position retention mechanism 15 is coupled to the connector interfaces 35 previously described. The manufacture can then repeat this assembly for each side of the variable angle connector 60 to which a connector interface 35 (and corresponding wall module 30) is to be mounted with multiple other position retention mechanisms 15.

After attaching all position retention mechanisms 15c as appropriate on each side of the variable angle connector 60, the manufacturer then aligns each connector interface 35 of each wall module 30 about the variable angle connector 60. In particular, and as previously described herein, the manufacturer can slide or otherwise position the portion (i.e., facing wall 13b) of each position retention mechanism 15c into the channels 33 of the corresponding connector interfaces 35, so that the opposing walls 13a-b of each position retention mechanism 15c travel along corresponding rails 31 in a connector interface 35 for that side. The manufacturer then slides the variable angle connector 60 along rails 31 (via the position retention mechanism) until each position retention mechanism 15c engages corresponding notches 37 (top, bottom, or mid-span notches) in the corresponding connector interface 35. An intersection (or virtual connector post) is formed when all desired wall modules 30 (and/or connector interfaces) are connected as appropriate to the faces of at least one variable angle connector 60.

To add stability, one will appreciate that the manufacture can also use more than one variable angle connector 60 at the intersection. In particular, the manufacturer can repeat the above-described process(es) by adding multiple different variable angle connectors at the same intersection (or virtual connector post). Of course, one will appreciate that it will generally be preferred that when multiple variable angle connectors 60 are used in the same intersection, each variable angle connector 60 will be of the same shape and dimension, or at least complementary in shape or dimension. For example, a manufacturer could potentially use a triangle shaped variable angle connector and a half-triangle shaped variable angle connector in the same intersection (or virtual connector post).

Accordingly, FIGS. 1A-5B and the corresponding text illustrate or otherwise describe a number of components and mechanisms that can be used to efficiently and securely fasten one or more multiple wall modules in a modular partition assembly. In particular, FIGS. 1A-5B illustrate a number of different components that can be used not only to fasten wall modules together at various positions, but also to create custom wall module partitions, such as at unconventional angles. The components and mechanisms described herein, therefore, provide a number of advantages in terms of assembling and even designing modular wall partitions.

One will appreciate, therefore, that implementations of the present invention can include not only the individual components and configurations described herein, but also systems including the same. For example, a system for partitioning an interior space can include at least two wall modules, at least two connector interfaces, and at least one position retention mechanism. In addition, the system can include one or more gaskets for sealing the joints between the wall modules.

In the event the wall modules comprise multiple, vertically connected panels, the system (or an alternative thereof) can also comprise multiple panels, and at least two connector interfaces for connecting the vertical joints between the two panels. The system can further comprise a connector interface for connecting the adjoined panels to another wall module (which may also include multiple panels vertically adjoined together). In both of the above-mentioned systems, the system can comprise any number or configuration of position retention mechanisms, as needed, such as those with two right angle returns, those with only one right angle return, and those with no right angle returns (i.e., essentially planar walls).

Along these lines, the above-mentioned systems (or an alternative thereto) can further comprise a system for creating variably-shaped virtual connector posts of intersecting wall modules. Such a system can comprise at least one variable angle connector, and at least one position retention mechanism (with at least one right angle return) for each side of the variable angle connector. The system can further comprise a set of at least two connector interfaces (with or without the corresponding remainder of a given wall module 30), which are to be connected to each side of the variable angle connector.

Accordingly, implementations of the present invention can be varied any number of ways. The present invention may, therefore, be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A position retention member configured to releasably secure a plurality of modular wall components together, comprising:
   a body having a front surface, a back surface, and a plurality of edges surrounding the front and back surfaces, the plurality of edges including a first edge, a second edge opposite the first edge, a third edge, and a fourth edge opposite the third edge;
   a first channel extending from the first edge partially through the body toward the second edge;
   a second channel extending from the second edge partially through the body toward the first edge;
   a first flange extending from the upper edge of the front surface in a first direction generally perpendicular to the front surface;
   a second flange extending from the upper edge of the back surface in a direction generally opposite from the first direction;
   a first spring tab positioned within the first channel; and
   a second spring tab positioned within the second channel.

2. The position retention member as recited in claim 1, wherein a portion of the body separates the first channel from the second channel.

3. The position retention member as recited in claim 1, wherein the front surface is releasably securable to the back surface.

4. The position retention member as recited in claim 3, further comprising a fastener configured to secure the front surface to the back surface.

5. The position retention member as recited in claim 1, wherein the first spring tab and the second spring tab are releasably securable between the front surface and the back surface.

6. The position retention member as recited in claim 5, further comprising a bar separating the front surface from the back surface.

7. The position retention member as recited in claim 6, wherein the first spring tab and second spring tab are secured to opposing ends of the bar.

8. The position retention member as recited in claim 1, wherein the first spring tab extends from inside the first channel generally toward the first edge.

9. The position retention member as recited in claim 8, wherein the second spring tab extends from inside the second channel generally toward the second edge.

10. A retention mechanism configured to releasably align and retain a plurality of modular wall components in a desired position, comprising:
   first and second walls each having an upper edge, a lower edge, a first side edge, and a second side edge opposing the first side edge;
   a connection member extending between and connecting the first and second walls, the connection member being positioned generally in the center of the first and second walls;
   a first channel separating the first and second walls, the first channel being positioned on a first side of the connection member;
   a second channel separating the first and second walls, the second channel being positioned on a second side of the connection member, the second side of the connection member opposing the first side of the connection member;
   a first spring tab positioned within the first channel, the first spring tab extending from the connection member toward the first side edge; and
   a second spring tab positioned within the second channel, the second spring tab extending from the connection member toward the second side edge.

11. The position retention member as recited in claim 10, wherein the first and second channels are configured to each receive:
   at least a portion of a connector interface of a first modular wall component; and
   at least a portion of a connector interface of a second modular wall component;
   wherein the retention member can slide along the connector interfaces of the first and second modular wall components.

12. The position retention member as recited in claim 11, wherein the first and second spring tabs are configured to lock the position of the retention member relative to the connector interfaces of the first and second modular wall components.

13. The position retention member as recited in claim 10, further comprising a first flange extending from the upper edge of the first wall in a first direction generally perpendicular to the first wall.

14. The position retention member as recited in claim 13, further comprising a second flange extending from the upper edge of the second wall in a direction generally opposite from the first direction.

15. The position retention member as recited in claim 10, wherein the first and second wall are releasably securable to each other.

\* \* \* \* \*

UNITED STATES PATENT AND TRADEMARK OFFICE
CERTIFICATE OF CORRECTION

PATENT NO. : 7,832,154 B2
APPLICATION NO. : 11/855477
DATED : November 16, 2010
INVENTOR(S) : Gosling et al.

It is certified that error appears in the above-identified patent and that said Letters Patent is hereby corrected as shown below:

Column 2
Line 17, delete ")"
Line 17, change "module" to --modules--

Column 3
Line 56, delete ")"
Line 56, change "module" to --modules--

Column 5
Line 41, change "interface" to --interfaces--

Column 8
Line 19, change "component" to --components--
Line 64, change "15" to --15c--

Column 9
Line 11, change "15" to --15c--

Signed and Sealed this
Nineteenth Day of July, 2011

David J. Kappos
*Director of the United States Patent and Trademark Office*